United States Patent
Suginoya

(10) Patent No.: US 7,327,426 B1
(45) Date of Patent: Feb. 5, 2008

(54) METHOD OF MANUFACTURING LIQUID CRYSTAL DISPLAY

(75) Inventor: Mitsuru Suginoya, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/914,484

(22) PCT Filed: Mar. 1, 2000

(86) PCT No.: PCT/JP00/01209

§ 371 (c)(1),
(2), (4) Date: Jan. 10, 2002

(87) PCT Pub. No.: WO00/52522

PCT Pub. Date: Sep. 8, 2000

(30) Foreign Application Priority Data

Mar. 2, 1999 (JP) .................................. 11/054602

(51) Int. Cl.
*G02F 1/1337* (2006.01)
(52) U.S. Cl. ....................... 349/130; 349/124
(58) Field of Classification Search ........ 349/124–130, 349/187
See application file for complete search history.

(56) References Cited

U.S. PATENT DOCUMENTS

| 5,390,037 A | * | 2/1995 | Negishi ...................... 349/126 |
| 5,757,456 A | | 5/1998 | Yamazaki et al. .......... 349/151 |
| 5,917,569 A | * | 6/1999 | Tanuma et al. ............. 349/123 |

FOREIGN PATENT DOCUMENTS

| EP | 62270918 | 11/1987 |
| EP | 0132229 | 2/1989 |
| EP | 8190078 | 7/1996 |
| EP | 0788012 | 8/1997 |

* cited by examiner

*Primary Examiner*—Dung T. Nguyen
(74) *Attorney, Agent, or Firm*—Adams & Wilks

(57) ABSTRACT

In a manufacturing method of a liquid crystal display unit, a roll of a flexible polymeric substrate having transparent electrodes and a longitudinal length longer than a transversal width is provided. The flexible polymeric substrate is continuously fed from the roll in the longitudinal direction while sequentially forming a vertical orientation film on the flexible polymeric substrate, solidifying the vertical orientation film, and prescribing a falling direction of liquid crystal molecules in the vertical orientation film.

20 Claims, 4 Drawing Sheets

METHOD OF MANUFACTURING LIQUID CRYSTAL DISPLAY

BACKGROUND OF THE INVENTION

1. Field of the Invention

The present invention relates to a manufacturing method of a liquid crystal display unit using a polymeric substrate, and more particularly relates to a method for simply manufacturing a liquid crystal display unit excellent in mass production by using the polymeric substrate.

2. Background Information

FIG. 7 shows the construction of a conventional STN (Super Twisted Nematic) liquid crystal display unit using a polymeric substrate. One example of a manufacturing method of the STN liquid crystal display unit using the polymeric substrate will be explained with reference to FIG. 7. A transparent substrate 22 constructed by ITO is formed on a polymeric substrate 21 constructed by polycarbonate, etc. Next, polyamic acid or polyimide solution is printed and hardened on the polymeric substrate 21 so that an orientation film 23 constructed by polyimide is formed. Next, this substrate 21 is orientated by rubbing this substrate 21 with a buff cloth constructed by cotton and rayon fibers. A transparent electrode 25 constructed by the ITO and an orientation film 26 are similarly formed on another opposite polymeric substrate 24. This substrate 24 is orientated by rubbing such that a rubbing direction of this substrate 24 forms an angle of about 200 to 260° with respect to the rubbing direction of the previous substrate 21. These two substrates are opposed to each other and are integrated with each other by a sealant 27. A liquid crystal 28 is sealed into a clearance of these substrates so that an STN liquid crystal display unit is formed. In the STN liquid crystal display unit using such a polymeric substrate, the substrate is formed by a high polymer instead of conventional glass so that the display unit is not easily cracked and can be made light in weight. Further, since an STN display mode is used, the deterioration of display quality is small even when the number of electrodes operated in time division is increased. A large capacity display can be also realized.

Another advantage of the adoption of the polymeric substrate is that a continuous processing treatment can be taken by so-called Roll to Roll in addition to sheet-fed processing as in a working process treatment of the glass substrate so far since the polymeric substrate is flexible. In the continuous processing using Roll to Roll, an orientation film printing process, an orientation film solidifying process and an orientation process can be continuously performed by using the polymeric substrate 31 wound in a roll shape so that the manufacturing method is very simple and excellent in mass production.

However, the orientation of the orientation film in the STN display mode is a homogeneous (parallel) orientation, and the orientation angles of both the upper and lower substrates range from 200 to 260° and therefore are not constant in accordance with the specification of a product.

Since no rubbing direction for processing is constant in accordance with the product, the rubbing direction of the rubbing buff cloth must be changed to a predetermined angle with respect to a flowing direction of the substrate at each tooling changing time so that it takes much time and labor. A continuous substrate extending in a longitudinal direction is used in the continuous processing using Roll to Roll. Therefore, after all one roll is processed, the operation of a line is stopped and tooling is changed. In the case of the STN liquid crystal display unit, important characteristics such as electro-optic characteristics, an angle of visibility, etc. are determined by the orientation direction. Therefore, it is not too much to say that the orientation direction is changed every product. When the operation on the continuous line is stopped every product, productivity is reduced in comparison with the working process of the glass substrate of sheet-fed processing.

In the rubbing process for obtaining the homogeneous orientation, rubbing force in the rubbing is relatively strong so that the polymeric substrate much softer than glass is damaged. Therefore, there is a case in which a serious defect in display quality is caused.

Further, high optical isotropy is required in the polymeric substrate because of the homogeneous orientation having such an unfixed angle. The reasons for this are as follows. The STN liquid crystal display unit is optically designed such that a polarizing element is arranged outside a cell and linearly polarized light is incident to a liquid crystal molecule. The glass substrate generally used in the liquid crystal display unit is conventionally optically isotropic, and the linearly polarized light incident in any direction is emitted as linearly polarized light in a direction as it is. Therefore, the STN optical design could be made by neglecting the substrate.

However, in the case of the polymeric substrate, refractive indexes in the x and y directions are almost anisotropic, and are optically not isotropic. Namely, the linearly polarized light incident from a direction except for these x and y directions becomes elliptically polarized light at an emitting time from the polymeric substrate so that the optical design of the STN liquid crystal display unit greatly gets out of order. Two solving methods of this problem are considered. One solving method is to remove the optical anisotropy of the used polymeric substrate. However, to remove the optical anisotropy of the polymeric substrate, it is necessary to reduce the optical anisotropy of a material molecule itself, and consider that no material molecule is arranged in one direction at a manufacturing time of the substrate. Therefore, the substrate manufacture becomes very complicated, and a selecting range of the material itself is very limited. Another solving method is to align the orientation direction of a liquid crystal molecule on the substrate, and a phase advancing axis direction or a phase delaying axis direction of the optical anisotropy of the polymeric substrate. If this method is adopted, the linearly polarized light incident to the polymeric substrate does not become elliptically polarized light at the emitting time, and is the linearly polarized light as it is so that no optical design gets out of order. However, in the case of the polymeric substrate having an elongated roll shape, the phase advancing axis direction or the phase delaying axis direction of the optical anisotropy must be set to be parallel or perpendicular to a long side due to a restriction from the manufacturing method of the polymeric substrate. Therefore, no orientation angle can be set to an arbitrary angle from 200 to 260° required in the STN. In contrast to this, when a pattern is arranged in the orientation direction, a pattern utilization rate in the polymeric substrate is greatly reduced and a combination of upper and lower substrates in a later assembly process becomes very complicated.

As mentioned above, the conventional manufacturing method of the display unit using the polymeric substrate has the above problems. Accordingly, it is impossible to simply realize the manufacturing method in Roll to Roll by using flexibility of the polymeric substrate. Therefore, an object of the present invention is to provide a simple manufacturing method having high productivity without damaging the polymeric substrate.

SUMMARY OF THE INVENTION

In the present invention, it has been found that a polymeric substrate is continuously moved in a longitudinal direction and is manufactured in a vertical orientation film forming process and a vertical orientation film hardening process by using a vertical orientation (VA) mode in orientation processing of the polymeric substrate.

Namely, when a display unit is manufactured by using the polymeric substrate having a longitudinal length longer than a transversal length, a process for forming a vertical orientation film material on the polymeric substrate and a process for obtaining a vertical orientation film by solidifying this material are performed by continuously moving the polymeric substrate in the longitudinal direction. In other words, the orientation film can be formed by orientating the polymeric substrate in the vertical orientation (VA) mode while the polymeric substrate is continuously moved or fed from the polymeric substrate roll in the longitudinal direction.

Further, after the vertical orientation film is formed, a process (orientation process) for prescribing the falling direction of a liquid crystal molecule is subsequently performed by continuously moving the polymeric substrate in the longitudinal direction. Since it is sufficient to perform rubbing in a constant direction the vertical orientation mode even when the characteristic specification of a liquid crystal is changed, orientation processing can be performed while the polymeric a substrate is moved, or fed from the roll, in the longitudinal direction, thereby greatly improving productivity.

As a concrete orientation method, there is a method for rubbing the polymeric substrate in its moving direction, or a method for performing the orientation processing by containing a functional group changed in structure by light in the orientation film and by moving the polymeric substrate while light is irradiated from a constant direction.

Further, a process for forming a transparent electrode pattern in the polymeric substrate and a process for forming the vertical orientation film in the polymeric substrate are arranged, and a buffer of the polymeric substrate continuously moved is arranged between these processes so as to continuously move the polymeric substrate in the longitudinal direction. Thus, the patterning process unable to perform exposure processing unless stoppage is once performed, and the vertical orientation film forming process able to perform continuous processing can be continuously performed without stopping the movement of the polymeric substrate.

Figure 3:
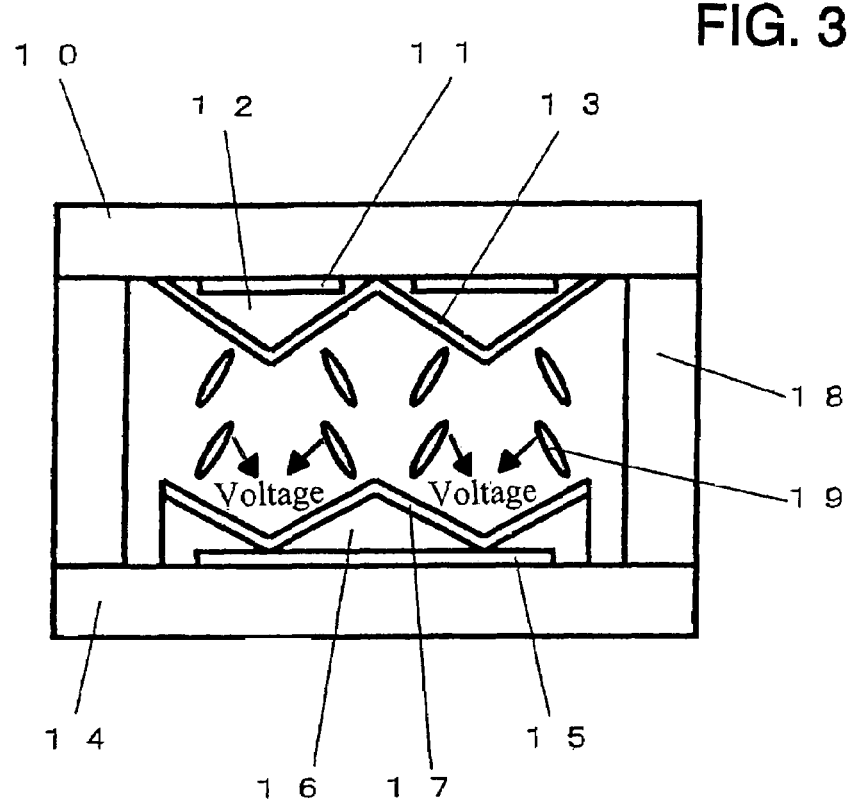
Figure 4:
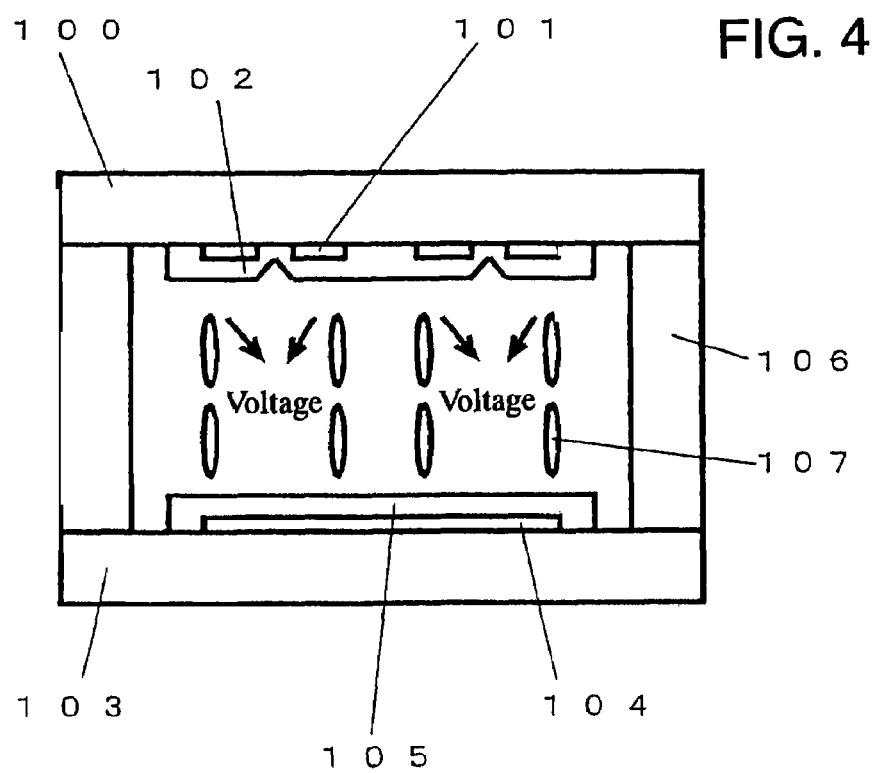

Each of FIGS. 3 and 4 is a view showing a section of another construction of the display unit in the present invention.

Figure 5:
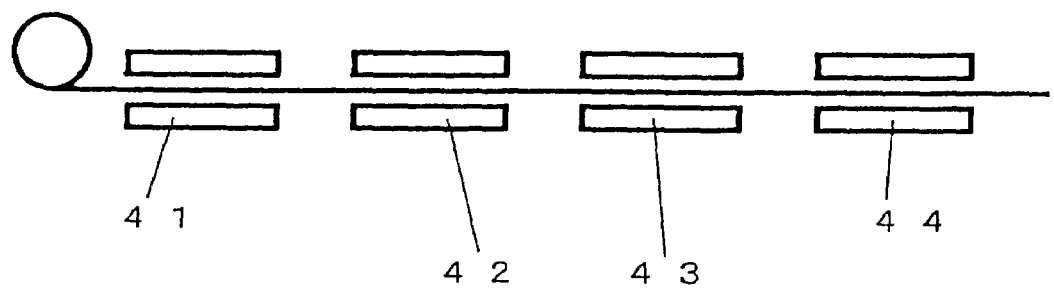
Figure 6:
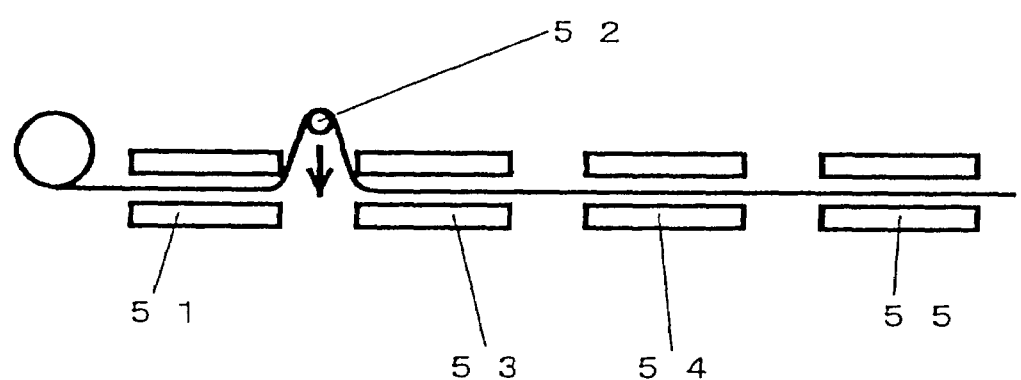

Each of FIGS. 5 and 6 is a view typically showing another manufacturing process of the display unit in the present invention.

Figure 7:
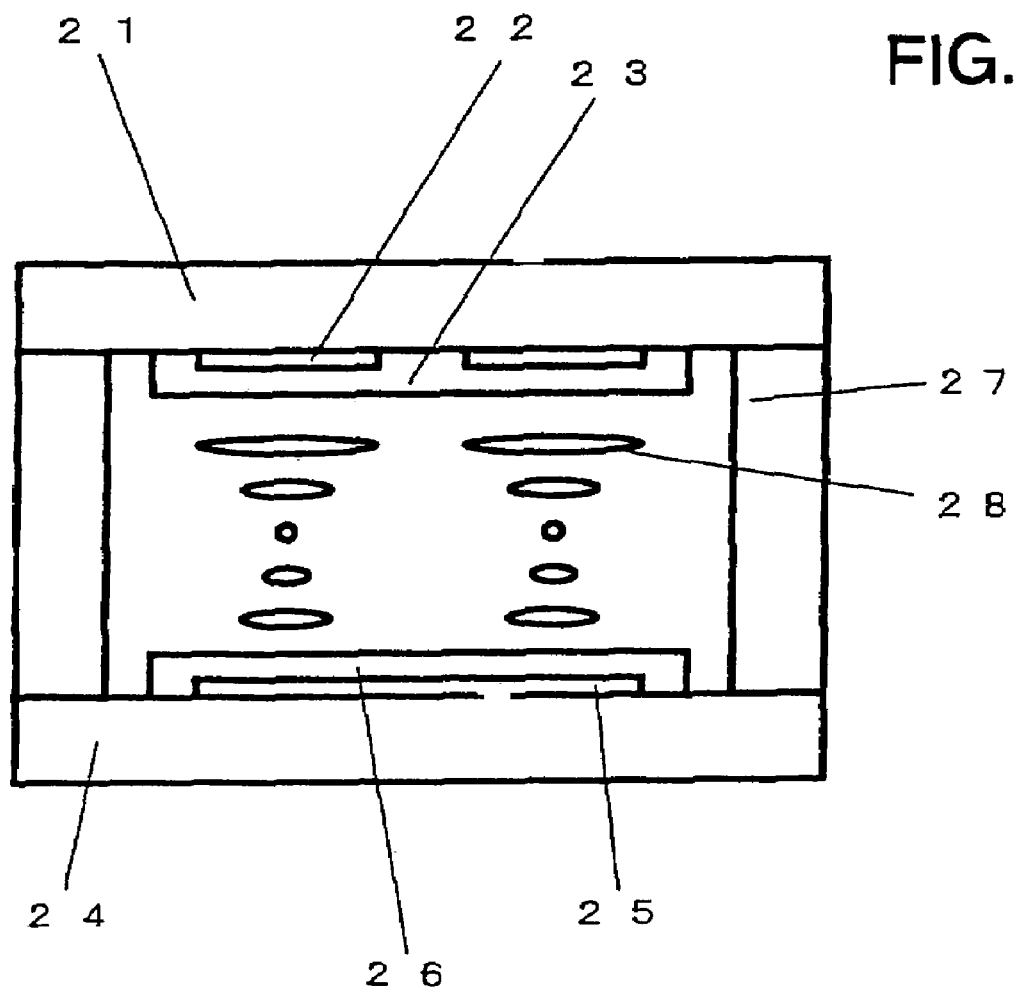

FIG. 7 is a view showing a section of the construction of a conventional display unit.

DESCRIPTION OF THE PREFERRED EMBODIMENTS

The embodiment modes of the invention will next be explained on the basis of the drawings.

FIGS. 1 to 6 show typical views of the construction of a liquid crystal display unit of a polymeric substrate using a vertical orientation (VA) mode in the present invention and its manufacturing method. The vertical orientation (VA) mode is a conventionally known display mode, and is excellent in time division characteristics, and can obtain preferable display characteristics.

Figure 1:
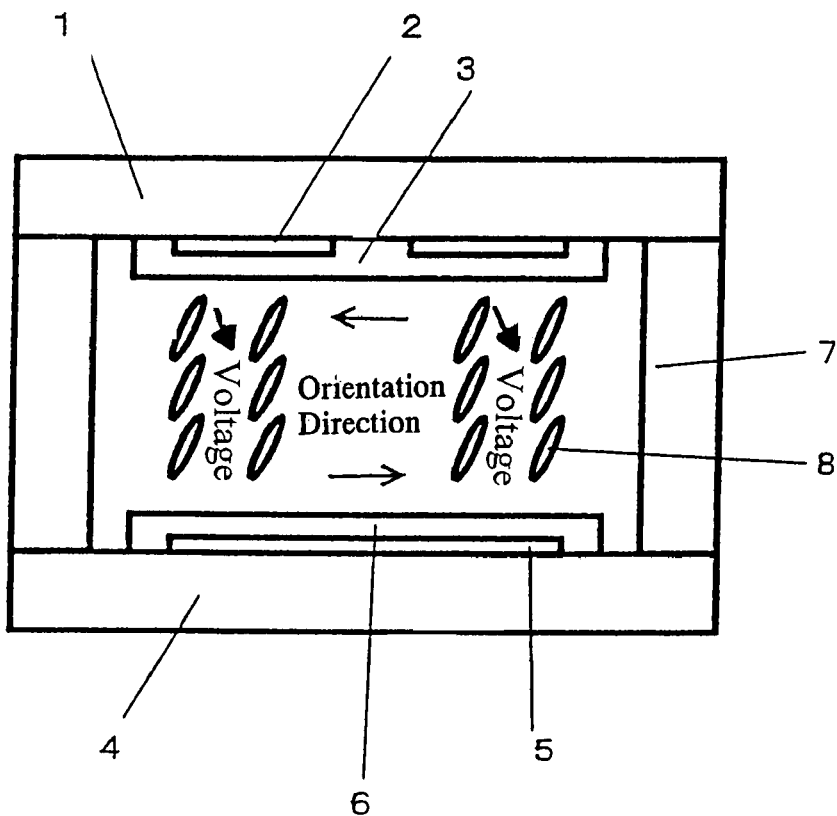
FIG. 1 is a view showing a section of the construction of a display unit in the present invention.

FIG. 1 shows a typical construction utilizing the vertical orientation (VA) mode in the liquid crystal display unit using the polymeric substrate in the present invention. A liquid crystal molecule 8 having negative dielectric anisotropy is orientated in a direction slightly inclined from a vertical direction with respect to the polymeric substrate 1 within a cell. Thus, when a voltage is applied to a transparent electrode 2, the liquid crystal molecule uniformly falls in an inclining direction so that a uniform optical change is caused. Such an initial orientation is normally made by forming a vertical orientation film 3 on a substrate face and rubbing the vertical orientation film 3 in one direction. In such a description, it seems that this mode is the same as an STN display mode. However, since the rubbing simply determines the falling direction, there is a substantial difference in that it is sufficient to set one constant direction. Namely, when the vertical orientation mode is used in the display unit using the polymeric substrate as in the present invention, both upper and lower substrates may be rubbed only in a longitudinal substrate moving direction, and it is not necessary to substantially change this direction even when a characteristic specification of the display unit is changed. When the upper and lower substrates are assembled, as shown in FIG. 1, it is sufficient to set only the rubbing directions of the upper and lower substrates to be opposite. At this time, a flowing direction of the polymeric substrate, i.e., a phase advancing axis or a phase delaying axis of the optical anisotropy is parallel to the rubbing direction, i.e., the orientation direction of the liquid crystal molecule on the substrate surface at any time. No optical anisotropy having the polymeric substrate has a bad influence on optical design as at an STN time. Therefore, the polymeric substrate can be selected in serious view of transparency, durability and cost, and can be very simply manufactured.

In accordance with the present invention, rubbing strength also determines only the falling direction so that no strong rubbing is required. Accordingly, there is no fear that the soft polymeric substrate is damaged. If the substrate is a conventional glass substrate in such a vertical orientation mode, similar to the STN mode, only a sheet-fed treatment process can be performed and no features of the simple manufacturing method provided in the vertical orientation mode itself can be used at all. The features of the simple manufacturing method are used for the first time in combination with the polymeric substrate able to perform continuous processing as in the present invention.

Figure 2:
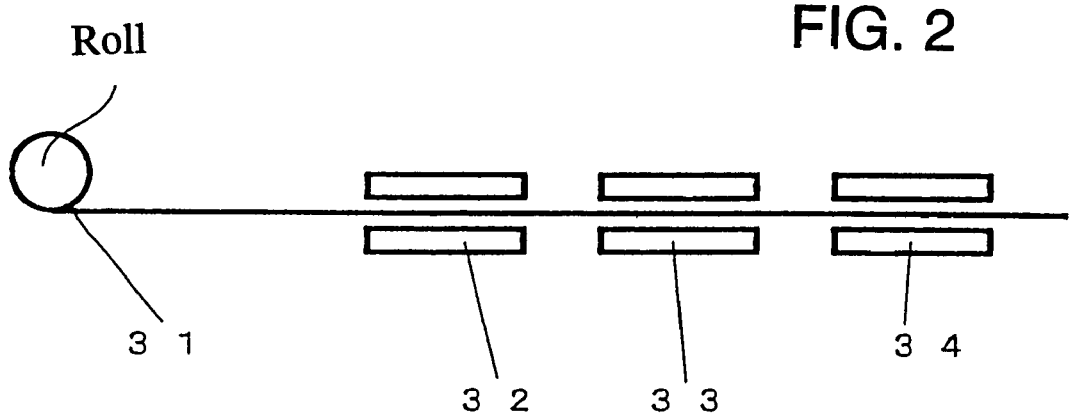
FIG. 2 is a view typically showing a manufacturing process of the display unit in the present invention.

FIG. 2 shows a typical view of the manufacturing method of the present application invention adopting the vertical orientation mode in the polymeric substrate. The polymeric substrate continuously extending in a longitudinal direction wound in a roll shape. This polymeric substrate 31 is continuously processed in a process 32 for forming an orientation film, a process 33 for solidifying the orientation film and an orientation process 34. Namely, orientation processing from the formation of the orientation film to rubbing during the orientation process can be performed by continuous processing.

In addition to the construction of the liquid crystal display unit in the vertical orientation mode shown in FIG. 1, it is known that view angle characteristics of the display are improved by setting the falling direction of a liquid crystal molecule in the vertical orientation mode to two opposite directions different by 180° from each other within one pixel. FIG. 3 shows one example of this setting. As shown in FIG. 3, an inclination film 12 having an angular inclination is formed on the polymeric substrate 10, and a vertical orientation film 13 is formed on this inclination film 12. In accordance with such a construction, if a voltage is applied to a transparent electrode 11 without rubbing, the falling directions of the liquid crystal molecule 19 on both sides of an angular apex are opposed to each other so that an initial inclination for improving the view angle characteristics is obtained. In this case, since no rubbing process itself is required, there is no obstacle in the continuous working process of the polymeric substrate. Further, since no object comes in contact with the surface of the soft polymeric substrate, this surface is not damaged at all.

There is a construction shown in FIG. 4 as another method for setting the falling direction of the liquid crystal molecule in the vertical orientation mode to two or more directions within one pixel. As shown in FIG. 4, there is also a method in which a slit is formed in a transparent electrode 101 on the polymeric substrate 100 so that the direction of an electric field in this slit portion is distorted and the falling direction of the liquid crystal molecule 107 is prescribed. A vertical orientation film 102 is formed on this slit electrode 101 so that the falling directions of the liquid crystal molecule 107 are opposed to each other by inclinations of the electric field on both sides of the electrode slit without rubbing. Accordingly, the initial inclination for improving the view angle characteristics is obtained. In this case, no rubbing process itself is also required so that there is no obstacle in the continuous working process of the polymeric substrate.

Further, an orientation film orientated by irradiating light in a constant direction is recently developed instead of the restriction of the orientation direction using the rubbing of the polymeric orientation film. A functional group for causing a change in the structure of a high polymer such as polyimide, cinnamate, chalcone, azobenzene families, etc. by light is introduced in principle, and three-dimensionally causes the structural change in accordance with a direction of the irradiated light so that an entire arrangement of the high polymer is put in order. This method can be also applied to the present invention, and is achieved by designing the above initial structure of the high polymer so as to be vertically oriented, and irradiating light inclined from a vertical direction or light having inclined polarized light to the substrate after a film is formed. In this case, no rubbing is also required so that there is no obstacle in the continuous working process of the polymeric substrate, and it is sufficient to irradiate light in a constant direction instead of the rubbing in the orientation process 34 in FIG. 2.

No exposure process for patterning an electrode in all manufacturing processes of the liquid crystal display unit can be generally performed by continuously moving the polymeric substrate. In the exposure process, it is necessary to irradiate an ultraviolet ray by aligning specific positions of a mask and the substrate. Accordingly, it is necessary to restrain the substrate for a constant time. It is opposed to the object of a simple manufacturing method having high productivity in the present invention that movements of the other processes are restrained every time the substrate is restrained in the exposure process.

Accordingly, a patterning process is performed separately by sequentially moving the polymeric substrate, and the patterned polymeric substrate is wound in a roll shape in advance as shown in FIG. 2. Next, it is necessary to take a measure for continuously processing this polymeric substrate 31 of the roll shape in a process 32 for forming an orientation film, a process 33 for solidifying the orientation film, and an orientation process 34 while continuously feeding the polymeric substrate 31 from the roll in the longitudinal direction.

There is another method in which the patterning process is also arranged in a processing method of Roll to Roll, and a buffer for restraining the substrate at an exposure time in the patterning process is arranged within this patterning process or between the patterning process and the process for forming the orientation film.

FIG. 5 shows an example in which a substrate buffer is arranged within the patterning process. The polymeric substrate supplied from a polymeric substrate roll is moved to the patterning process 41 in which the substrate buffer is arranged. A buffer able to accumulate the substrate of a stopping amount in exposure is arranged within this patterning process so as not to stop a flow of the substrate in an outlet. Thereafter, the polymeric substrate is continuously processed in a process 42 for forming an orientation film, a process 43 for solidifying the orientation film, and an orientation process 44.

FIG. 6 shows an example in which the buffer is arranged between the patterning process and a printing process of the orientation film. The polymeric substrate wound in a roll shape is moved to the patterning process 51 and passes an exposure process of restraining processing in this patterning process. The substrate next enters a buffer roll 52. The buffer roll is first arranged in a position deviated from a continuous path so that the substrate is detoured and moved. However, when the next restraint and exposure are started within the patterning process, the buffer roll is moved in a path direction of the substrate and continuously supplies the polymeric substrate to the next process 53 for forming an orientation film. Thereafter, the substrate is continuously processed in a process 54 for solidifying the orientation film and an orientation process 55 so that a simple manufacturing method of the liquid crystal display unit having high productivity is provided.

There is no limit in the polymeric substrate used in the present invention if this polymeric substrate is a transparent high polymer. The polymeric substrate is constructed by polyether sulfone (PES), polycarbonate (PC), polyallylate (PAR), amorphous polyolefin (APO), polyether.ether.ketone (PEEK), polyethylene terephthalate (PET), heat resisting polyolefinic resin, allyl diglycol carbonate resin (ADC resin), acrylic resin, norbornene resin, maleimide resin, transparent epoxy resin, transparent polyimide resin, etc. The thickness of the polymeric substrate is suitably selected in a range from 0.1 to 1.0 mm. It is desirable to set optical anisotropy $\Delta$nd on the phase advancing axis and the phase delaying axis to be equal to or smaller than 5 nm in the STN, but there is no such limit in the present invention.

The present invention will next be explained in more detail on the basis of embodiments.

Embodiment 1

One example of a display unit using a polymeric substrate in the present invention will be explained with reference to FIG. 1. A high polymer forming the polymeric substrate 1 can be suitably selected from polyether sulfone (PES), polycarbonate (PC), polyallylate (PAR), amorphous polyolefin (APO), polyether ether ketone (PEEK), polyethylene terephthalate (PET), allyl diglycol carbonate resin (ADC resin), acrylic resin, norbornene resin, maleimide resin, transparent epoxy resin and transparent polyimide resin. This embodiment uses a PES substrate having 0.2 mm in thickness and 10 nm in optical anisotropy on the phase advancing axis and the phase delaying axis, i.e., optical anisotropy Δnd in longitudinal and transversal directions of the substrate. A transparent electrode 2 constructed by ITO is next formed by low temperature sputtering, etc. In this substrate, a transparent electrode is patterned by a patterning process of a separate sequential movement, and this substrate is wound in a roll shape. Thereafter, this substrate is processed by applying a continuous treatment process shown in FIG. 2. Namely, in this embodiment, a vertical orientation agent of a polyimide family high polymer is printed on the polymeric substrate, and is solidified and forms a vertical orientation film. Further, the vertical orientation film is considerably weakly rubbed in a constant direction parallel to the longitudinal direction.

Thus, in this embodiment, the vertical orientation agent of the polyimide family high polymer is used in the orientation film 3 in FIG. 1, and the rubbing process is considerably weakly performed in the constant direction parallel to the longitudinal direction in comparison with the normal STN liquid crystal display unit. Therefore, there is no damage due to the rubbing, and there is no necessity of a change in tooling in which the rubbing direction is changed with respect to any product. Accordingly, this embodiment shows very high productivity.

Similarly, a polymeric substrate 4 forming a transparent electrode 5 and an orientation film 6 thereon in FIG. 1 is processed by the same process, and is stuck to the polymeric substrate 1 by a sealant 7 such that rubbing directions are opposed to each other. A liquid crystal having negative dielectric anisotropy is sealed into a clearance of these polymeric substrates so that a liquid crystal display unit is formed.

Such a manufactured liquid crystal display unit is characterized in that this display unit is light in weight and is not cracked since the substrate is a high polymer. Further, display characteristics of this display unit are favorable in comparison with the STN liquid crystal display unit. In accordance with this embodiment, the display unit of the polymeric substrate favorable in comparison with the conventional display unit can be simply manufactured with high productivity.

Embodiment 2

FIG. 3 is a view showing another example of the display unit using the polymeric substrate. A high polymer contained in a polymeric substrate 10 can be suitably selected from polyether sulfone (PES), polycarbonate (PC), polyallylate (PAR), amorphous polyolefin (APO), polyether.ether.ketone (PEEK), polyethylene terephthalate (PET), allyl diglycol carbonate resin (ADC resin), acrylic resin, norbornene resin, maleimide resin, transparent epoxy resin and transparent polyimide resin. This embodiment uses a PC substrate having 0.1 mm in thickness and 15 nm in optical anisotropy on the phase advancing axis and the phase delaying axis, i.e., optical anisotropy Δnd in longitudinal and transversal directions of the substrate. A transparent electrode 11 constructed by ITO is next formed by low temperature sputtering, etc. This substrate is processed by applying a continuous treatment process shown in FIG. 5.

In this embodiment, an inclination film 12 having an angular inclination in FIG. 3 is manufactured by using a photoresist in addition to patterning of the transparent electrode in a patterning process 41. An orientation film 13 constructed by a vertical orientation agent of a polyimide family high polymer is formed on this inclination film 12, and is processed without performing the rubbing process. In this case, there is no damage seen at a rubbing time, and there is no necessity of a tooling change of changing the rubbing direction with respect to any product so that very high productivity is shown.

Similarly, a polymeric substrate 14 forming a transparent substrate 15, an inclination film 16 and an orientation film 17 thereon shown in FIG. 3 is processed by the same process. The polymeric substrate 14 and the polymeric substrate 10 are stuck to each other by a sealant 18 such that tops and bottoms of the inclination films 16 are respectively opposed to each other. A liquid crystal having negative dielectric anisotropy is sealed into a clearance of these polymeric substrates so that a liquid crystal display unit is formed.

Such a manufactured liquid crystal display unit is characterized in that this display unit is light in weight and is not cracked since the substrate is a high polymer. Further, display characteristics of this display unit are favorable in comparison with the STN liquid crystal display unit. In accordance with this embodiment, the display unit of the polymeric substrate favorable in comparison with the conventional display unit can be simply manufactured with high productivity.

Embodiment 3

FIG. 4 is a view showing the construction of another example of the display unit using the polymeric substrate. A high polymer contained in a polymeric substrate 100 can be suitably selected from polyether sulfone (PES), polycarbonate (PC), polyallylate (PAR), amorphous polyolefin (APO), polyether.ether.ketone (PEEK), polyethylene terephthalate (PET), allyl diglycol carbonate resin (ADC resin), acrylic resin, norbornene resin, maleimide resin, transparent epoxy resin and transparent polyimide resin. This embodiment uses an amorphous polyolefin substrate having 0.15 mm in thickness and 10 nm in optical anisotropy on the phase advancing axis and the phase delaying axis, i.e., optical anisotropy Δnd in longitudinal and transversal directions of the substrate. A transparent electrode 101 constructed by ITO is next formed by low temperature sputtering, etc. This substrate is processed by applying a continuous treatment process shown in FIG. 6. In this embodiment, the transparent electrode 101 is patterned and formed in a patterning process such that the slit shown in FIG. 4 is inserted into the transparent electrode 101. An orientation film 102 constructed by a vertical orientation agent of a polyimide family high polymer is formed on this polymeric substrate, and is processed without performing the rubbing process. In this case, there is no damage seen at a rubbing time, and there is no necessity of a tooling change of changing the rubbing direction with respect to any product so that very high productivity is shown.

Similarly, a polymeric substrate 103 forming a transparent substrate 104 and an orientation film 105 thereon shown in FIG. 4 is processed by the same process. The polymeric substrate 103 and the polymeric substrate 100 are stuck to each other by a sealant 106, and a liquid crystal having negative dielectric anisotropy is sealed into a clearance of these polymeric substrates so that a liquid crystal display unit is formed.

Such a manufactured liquid crystal display unit is characterized in that this display unit is light in weight and is not cracked since the substrate is a high polymer. Further, display characteristics of this display unit are favorable in comparison with the STN liquid crystal display unit. In accordance with this embodiment, the display unit of the polymeric substrate favorable in comparison with the conventional display unit can be simply manufactured with high productivity.

Embodiment 4

The polymeric substrate 1 in FIG. 1 is set to a polyallylate substrate having 0.15 mm in thickness and 20 nm in optical anisotropy of the phase advancing axis and the phase delaying axis, i.e., optical anisotropy Δnd in longitudinal and transversal directions of the substrate. A polyvinyl cinnamate vertical orientation film of a cinnamate family is used as an orientation film 3, and a continuous treatment process shown in FIG. 2 is performed. In this case, light in a direction slightly inclined from a vertical direction is irradiated in an orientation process 34 in FIG. 2. Namely, no rubbing is required. The orientation film 3 is formed by such a continuous treatment process, and is processed without performing the rubbing process. In this case, there is no damage seen at a rubbing time, and there is no necessity of a tooling change of changing the orientation direction with respect to any product so that this manufacturing method has very high productivity.

Such a manufactured liquid crystal display unit is characterized in that this display unit is light in weight and is not cracked since the substrate is a high polymer. Further, display characteristics of this display unit are favorable in comparison with the STN liquid crystal display unit. In accordance with this embodiment, the display unit of the polymeric substrate favorable in comparison with the conventional display unit can be simply manufactured with high productivity.

Embodiment 5

The orientation film 3 in the embodiment 4 is set to a chalcone family high polymer, and, similar to the embodiment 4, the display unit of the polymeric substrate is manufactured. Thus, effects similar to those in the embodiment 4 are obtained.

Embodiment 6

The orientation film 3 in the embodiment 4 is set to an azobenzene family high polymer, and, similar to the embodiment 4, the display unit of the polymeric substrate is manufactured. Thus, effects similar to those in the embodiment 4 are obtained.

As explained in detail in each of the above embodiments, the manufacturing method of the display unit in the present invention can manufacture the liquid crystal display unit using the polymeric substrate with high productivity while display quality favorable in comparison with the conventional case is held. Further, the liquid crystal display unit is not cracked, and is thin and light in weight and can be further provided at low cost by adopting the manufacturing method having high productivity in comparison with the conventional liquid crystal display unit using the glass substrate.

INDUSTRIAL APPLICABILITY

As mentioned above, the manufacturing method of the liquid crystal display unit in the present invention is useful when the liquid crystal display unit is continuously manufactured by Roll to Roll using the polymeric substrate. This manufacturing method can have high productivity and is suitable for manufacture of the liquid crystal display unit of the polymeric substrate at low cost.

The invention claimed is:

1. A manufacturing method of a liquid crystal display unit, comprising:
   a first step of providing a roll of a first flexible polymeric substrate having a longitudinal length longer than a transversal width;
   a second step of forming transparent electrodes on the first flexible polymeric substrate;
   a third step of forming a vertical orientation film on the first flexible polymeric substrate;
   a fourth step of solidifying the vertical orientation film;
   a fifth step of prescribing a falling direction of molecules of a liquid crystal having a negative dielectric anisotropy in the vertical orientation film, the falling direction being prescribed in parallel with a phase advancing axis or a phase delaying axis of an optical anisotropy of the first flexible polymeric substrate; and
   a sixth step of connecting the first flexible polymeric substrate to an opposed second flexible polymeric substrate;
   wherein the first flexible polymeric substrate is continuously fed from the roll in the longitudinal direction during the second, third, fourth, fifth and sixth steps.

2. A manufacturing method of a liquid crystal display unit according to claim 1; wherein the fifth step is performed by irradiating light in one direction onto the vertical orientation film.

3. A manufacturing method of a liquid crystal display unit according to claim 2; wherein the third step comprises the step of forming the vertical orientation film containing at least one high polymer selected from the group consisting of polyimides, cinnamates, chalcones and azobenzenes.

4. A manufacturing method of a liquid crystal display unit according to claim 1; wherein the fifth step is performed by rubbing the vertical orientation film in parallel with the longitudinal direction of the first flexible polymeric substrate.

5. A manufacturing method of a liquid crystal display unit according to claim 4; wherein the third step comprises the step of forming the vertical orientation film containing at least one high polymer selected from the group consisting of polyimides, cinnamates, chalcones and azobenzenes.

6. A manufacturing method of a liquid crystal display unit according to claim 1; further comprising a step of arranging a buffer of the first flexible polymeric substrate during the second step, or between the second step and the third step, so as to continually feed the first flexible polymeric substrate from the roll in the longitudinal direction during the third step.

7. A manufacturing method of a liquid crystal display unit according to claim 6; wherein the fifth step is performed by irradiating light in one direction onto the vertical orientation film.

8. A manufacturing method of a liquid crystal display unit according to claim 7; wherein the third step comprises the step of forming the vertical orientation film containing at least one high polymer selected from the group consisting of polyimides, cinnamates, chalcones and azobenzenes.

9. A manufacturing method of a liquid crystal display unit according to claim 6; wherein the fifth step is performed by rubbing the vertical orientation film in parallel with the longitudinal direction of the first flexible polymeric substrate.

10. A manufacturing method of a liquid crystal display unit according to claim 9; wherein the third step comprises the step of forming the vertical orientation film containing at least one high polymer selected from the group consisting of polyimides, cinnamates, chalcones and azobenzenes.

11. A manufacturing method of a liquid crystal display unit according to claim 6; wherein the third step comprises the step of forming the vertical orientation film containing at least one high polymer selected from the group consisting of polyimides, cinnamates, chalcones and azobenzenes.

12. A manufacturing method of a liquid crystal display unit according to claim 1; wherein the third step comprises the step of forming the vertical orientation film containing at least one high polymer selected from the group consisting of polyimides, cinnamates, chalcones and azobenzenes.

13. A manufacturing method of a liquid crystal display unit, comprising the steps of:
providing a roll of a flexible polymeric substrate having transparent electrodes and a longitudinal length longer than a transversal width; and
continuously feeding the flexible polymeric substrate from the roll in the longitudinal direction while sequentially forming a vertical orientation film on the flexible polymeric substrate, solidifying the vertical orientation film, and prescribing a falling direction of liquid crystal molecules in the vertical orientation film so that the falling direction is prescribed in parallel with a phase advancing axis or a phase delaying axis of an optical anisotropy of the flexible polymeric substrate.

14. A manufacturing method of a liquid crystal display unit according to claim 13; further comprising the steps of arranging the flexible polymeric substrate in confronting relation to an opposing flexible polymeric substrate to define a gap therebetween; and disposing a liquid crystal having a negative dielectric anisotropy in the gap between the flexible polymeric substrates.

15. A manufacturing method of a liquid crystal display unit according to claim 13; wherein the falling direction of liquid crystal molecules in the vertical orientation film is prescribed by irradiating light in one direction onto the vertical orientation film.

16. A manufacturing method of a liquid crystal display unit, comprising the steps of:
providing first and second rolls of respective first and second flexible polymeric substrates each having a longitudinal length longer than a transversal width;
continuously feeding the first flexible polymeric substrate from the first roll in the longitudinal direction while sequentially forming transparent electrodes on the first flexible polymeric substrate, forming a vertical orientation film on the first polymeric substrate, solidifying the vertical orientation film, and prescribing a falling direction of liquid crystal molecules in the vertical orientation film so that the falling direction is prescribed in parallel to a phase advancing axis or a phase delaying axis of an optical anisotropy of the first flexible polymeric substrate;
continuously feeding the second flexible polymeric substrate from the second roll in the longitudinal direction while sequentially forming transparent electrodes on the second flexible polymeric substrate, forming a vertical orientation film on the second polymeric substrate, solidifying the vertical orientation film formed on the second polymeric substrate, and prescribing a falling direction of liquid crystal molecules in the vertical orientation film formed on the second polymeric substrate so that the falling direction is prescribed in parallel to a phase advancing axis or a phase delaying axis of an optical anisotropy of the second flexible polymeric substrate;
arranging the first and second flexible polymeric substrates opposite one another to define a gap therebetween; and
disposing a liquid crystal having a negative dielectric anisotropy in the gap between the first and second flexible polymeric substrates.

17. A manufacturing method of a liquid crystal display unit according to claim 16; wherein in each of the continuously feeding steps, the falling direction of liquid crystal molecules in the vertical orientation film is prescribed by irradiating light in one direction onto the vertical orientation film.

18. A manufacturing method of a liquid crystal display unit according to claim 16; wherein in each of the continuously feeding steps, the falling direction of liquid crystal molecules in the vertical orientation film is prescribed by rubbing the vertical orientation film in parallel with the longitudinal direction of the corresponding first or second flexible polymeric substrate.

19. A manufacturing method of a liquid crystal display unit according to claim 16; wherein each of the continuously feeding steps includes the step of arranging a buffer of the corresponding first or second flexible polymeric substrate during formation of the transparent electrodes or between the formation of the transparent electrodes and the formation of the vertical orientation film.

20. A manufacturing method of a liquid crystal display unit according to claim 16; wherein for each of the continuously feeding steps, the vertical orientation film is formed so as to contain at least one high polymer selected from the group consisting of polyimides, cinnamates, chalcones and azobenzenes.

* * * * *